United States Patent
Panwar et al.

(10) Patent No.: US 11,966,453 B2
(45) Date of Patent: Apr. 23, 2024

(54) ORDERING ANNOTATION SETS FOR MACHINE LEARNING

(71) Applicant: International Business Machines Corporation, Armonk, NY (US)

(72) Inventors: Naveen Panwar, Bangalore (IN); Anush Sankaran, Chennai (IN); Kuntal Dey, Rampurhat (IN); Hima Patel, Bengaluru (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 17/175,896

(22) Filed: Feb. 15, 2021

(65) Prior Publication Data

US 2022/0261597 A1    Aug. 18, 2022

(51) Int. Cl.
  *G06K 9/00* (2022.01)
  *G06F 18/2113* (2023.01)
  (Continued)

(52) U.S. Cl.
  CPC ...... *G06F 18/2148* (2023.01); *G06F 18/2113* (2023.01); *G06F 18/2155* (2023.01); *G06N 20/00* (2019.01)

(58) Field of Classification Search
  CPC .......... G06N 20/00; G06N 3/045; G06N 3/08; G06N 5/02; G06N 3/084; G06N 7/01;
  (Continued)

(56) References Cited

U.S. PATENT DOCUMENTS 9,710,598 B2      7/2017  Yamane et al.
2012/0054130 A1*  3/2012  Mensink ................. G06F 17/18
                                                          706/50
(Continued)

FOREIGN PATENT DOCUMENTS

CN    108062341 A    5/2018
CN    108710903 A    10/2018
(Continued)

OTHER PUBLICATIONS

Wong, J., "Google reportedly targeted people with 'dark skin' to improve facial recognition", Oct. 3, 2019, 3 pages.
(Continued)

*Primary Examiner* — Alex Kok S Liew
(74) *Attorney, Agent, or Firm* — Donald J. O'Brien

(57) ABSTRACT

Embodiments are disclosed for a method. The method includes receiving an annotation set for a machine learning model. The annotation set includes multiple data points relevant to a task for the machine learning model. The method also includes determining total weights corresponding to the data points. The total weights are determined based on multiple ordering constraints indicating multiple data classes and corresponding weights. The corresponding weights represent a relative priority of the data classes with respect to each other. The method further includes generating an ordered annotation set from the annotation set. The ordered annotation set includes the data points in a sequence based on the determined total weights.

20 Claims, 7 Drawing Sheets

(51) Int. Cl.
*G06F 18/214* (2023.01)
*G06N 20/00* (2019.01)

(58) Field of Classification Search
CPC .......... G06N 3/044; G06N 5/04; G06N 20/10; G06N 3/047; G06N 3/088; G06N 5/046; G06N 3/04; G06N 5/022; G06N 3/048; G06N 3/02; G06N 5/01; G06N 5/048; G06N 20/20; G06N 3/082; G06N 3/049
See application file for complete search history.

(56) References Cited

U.S. PATENT DOCUMENTS

| | | | | |
|---|---|---|---|---|
| 2012/0188283 | A1* | 7/2012 | Ohashi | G06V 10/772 382/128 |
| 2018/0342055 | A1 | 11/2018 | Lyman et al. | |
| 2020/0364235 | A1 | 11/2020 | Kannan et al. | |

FOREIGN PATENT DOCUMENTS

| | | |
|---|---|---|
| CN | 105095833 B | 3/2019 |
| CN | 105975916 B | 10/2019 |
| CN | 111079566 A | 4/2020 |
| EP | 1442427 B1 | 12/2005 |

OTHER PUBLICATIONS

Quach, K., "Google causes more facial-recog pain, machine learning goes quantum—and how to lose a job if an AI doesn't like your face", Oct. 6, 2019, 6 pages.

Anonymous, "Small Coresets to Represent Large Training Data for Support Vector Machines", Under review as a conference paper at ICLR 2018, 16 pages.

Feldman et al., "Turning Big data into tiny data:Constant-size coresets for k-means, PCA and projective clustering", Jul. 12, 2018, 70 pages.

Culotta et al., "Reducing labeling effort for structured prediction tasks", Copyright 2005, 6 pages.

Settles et al., "Active Learning with Real Annotation Costs", Appears in Proceedings of the NIPS Workshop on Cost-Sensitive Learning, 2008, 10 pages.

Baldridge et al., "Active Learning and the Total Cost of Annotation", Published in EMNLP 2004, 8 pages.

Settles, B., "Active Learning Literature Survey", Computer Sciences Technical Report 1648, Updated on: Jan. 26, 2010, 67 pages.

Mell et al., "The NIST Definition of Cloud Computing", Recommendations of the National Institute of Standards and Technology, Sep. 2011, 7 pages.

\* cited by examiner

ORDERING ANNOTATION SETS FOR MACHINE LEARNING

BACKGROUND

The present disclosure relates to ordering annotation sets, and more specifically to ordering annotation sets for machine learning.

Machine learning can be described as a computing architecture configured to teach an algorithm (e.g., a machine learning model) how to make a prediction about a specific class of data. For example, a machine learning model can predict, based on an analysis of a digital photo, whether the digital photo includes an image of a dog or a wolf. Before the machine learning model can make such predictions though, a data scientist may train the model to perform this classification task. In order to train this machine learning model, the data scientist may create an annotation set, containing multiple digital photos, each having an image of either a dog or a wolf. The data scientist can label these photos accordingly, and training involves the machine learning model analyzing the labeled set of digital photos to learn how to distinguish between a dog and a wolf in a digital image. Once the machine learning model is trained, the data scientist can input unlabeled digital photos, and determine if the machine learning model can make the prediction successfully. If not, the machine learning model may undergo further training.

Accordingly, some machine learning techniques in active learning and machine teaching are based on constructing a useful set of data points. The term, data point, refers to a single item in the annotation set, e.g., a digital photo in the dog-wolf model. Useful data points can represent areas where the data may be lacking (holes in the dataset). The training data input to the dog-wolf model may be limited to pictures of wolves with snow in the background. As such, the dog-wolf model may learn to associate images of snow with wolves. In this scenario, the dog-wolf model may mistake an image of a dog for a wolf because of the appearance of snow in the image. To mitigate such a challenge, the dataset can improve the training dataset by adding digital photos of wolves without snow and/or dogs with snow into the annotation set, and label the data points accordingly. In this way, the data scientist can build a more useful training dataset.

However, it may also be useful to sequence the annotation set, for example by prioritizing data points that can fill multiple holes in the dataset before data that does not address such holes. In this way, the machine learning model can address multiple weaknesses with fewer data points. Accordingly, using a sequenced dataset, the machine learning model may further refine its learning on data points that may only address one hole. There are some techniques for ordering data points, but these techniques typically are not configured to improve the actual machine learning. Rather, these techniques are more concerned with presenting data points to a labeler, and reducing human effort in labeling (which can be voluminous).

SUMMARY

Embodiments are disclosed for a method. The method includes receiving an annotation set for a machine learning model. The annotation set includes multiple data points relevant to a task for the machine learning model. The method also includes determining total weights corresponding to the data points. The total weights are determined based on multiple ordering constraints indicating multiple data classes and corresponding weights. The corresponding weights represent a relative priority of the data classes with respect to each other. The method further includes generating an ordered annotation set from the annotation set. The ordered annotation set includes the data points in a sequence based on the determined total weights. Advantageously, such embodiments are useful for improving the efficiency of training machine learning models.

Optionally, some embodiments sequence the data points in decreasing value of the total weights. Advantageously, such embodiments are useful for improving the efficiency of training machine learning models.

An additional embodiment is disclosed for a method. The method includes receiving an unlabeled dataset for a machine learning model. The unlabeled dataset includes multiple data points relevant to a task for the machine learning model. The method also includes determining weighted losses corresponding to the data points based on a loss algorithm for coreset selection scores corresponding to the data points. The weighted losses are determined based on ordering constraints. The ordering constraints indicate one or more data classes, and corresponding weights. The corresponding weights represent a relative priority of the data classes with respect to each other. Additionally, the method includes generating an ordered annotation set from the unlabeled dataset by selecting data points from the unlabeled dataset having a corresponding weighted loss that meets a predetermined threshold. The method also includes sequencing the selected data points in the ordered annotation set, based on the weighted losses. Advantageously, such embodiments are useful for improving: the efficiency of generating an annotation set for, and the training of, machine learning models.

An additional embodiment is disclosed for a method. The method includes receiving an unlabeled dataset for a machine learning model. The unlabeled dataset includes multiple data points relevant to a task for the machine learning model. The method also includes determining weighted losses corresponding to the data points based on a loss algorithm for coreset selection scores corresponding to the data points. The weighted losses are determined based on ordering constraints. The ordering constraints indicate one or more data classes, and corresponding weights. The corresponding weights represent a relative priority of the data classes with respect to each other. Additionally, the method includes generating an ordered annotation set from the unlabeled dataset by selecting data points from the unlabeled dataset having a corresponding weighted loss that meets a predetermined threshold. The method also includes sequencing the selected data points in the ordered annotation set, in decreasing value of the weighted losses. Advantageously, such embodiments are useful for improving: the efficiency of generating an annotation set for, and the training of, machine learning models.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
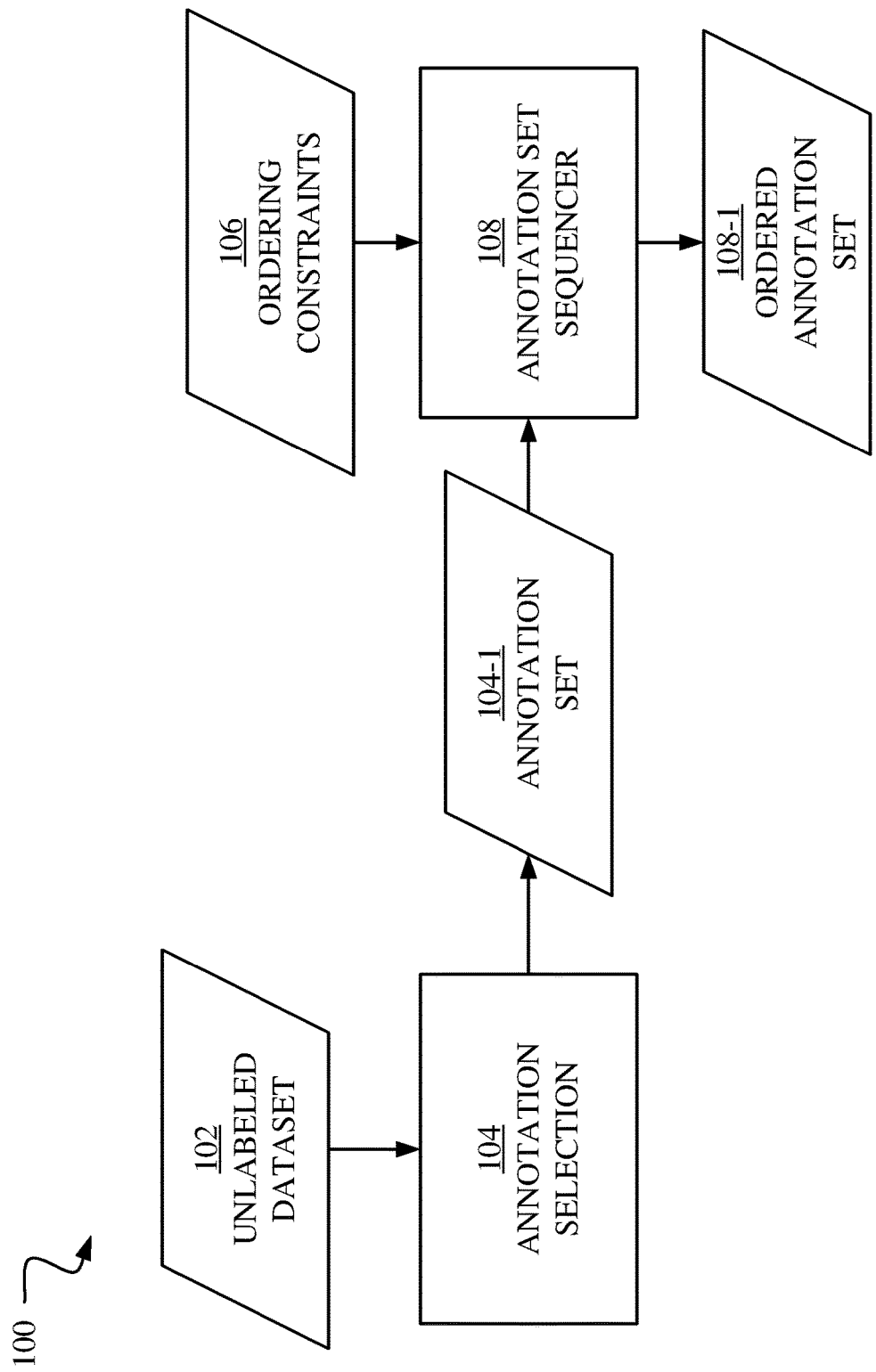
FIG. 1 is a data flow diagram of an example process for ordering annotation sets for machine learning, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, using a sequenced dataset can improve the efficacy of training a machine learning model. However, current techniques for ordering data points may not improve the machine learning.

Accordingly, some embodiments of the present disclosure can provide an ordered annotation set from a relatively large, unlabeled dataset. In some embodiments of the present disclosure, an active learning tool can generate an annotation set for sequencing based on predetermined constraints, or dimensions. Further, in some embodiments of the present disclosure, a joint selection sequence technique can generate a coreset by constraining an active learning tool to select and sequence data points based on a loss algorithm for the predetermined constraints. A coreset is a collection of data points that can approximate a larger collection of data points based on the diversity of the data included. In this way, some embodiments of the present disclosure can provide a coreset that is balanced along the dimensions of the predetermined constraints. Accordingly, some embodiments of the present disclosure can provide an improvement in computing technology by improving the efficiency of building useful coresets, coresets that additionally improve the efficacy of training machine learning models.

FIG. 1 is a data flow diagram of an example process 100 for ordering annotation sets for machine learning, in accordance with some embodiments of the present disclosure. The process 100 involves inputting an unlabeled dataset 102 to an annotation selection process 104. The unlabeled dataset 102 can include multiple data points that can potentially be useful for training a machine learning model. In the dog-wolf machine learning example, the unlabeled dataset 102 can include thousands of digital images of animals. The annotation selection process 104 can be an active learning process that generates an annotation set 104-1, also referred to herein as the coreset, by selecting data points from the unlabeled dataset 102 that can be useful for training a predetermined machine learning model. Active learning can refer to a machine learning tool that interacts with a data scientist when performing its task. For example, the annotation selection process 104 can generate the annotation set 104-1 by selecting digital images of dogs and wolves from the unlabeled dataset 102 based on the content of the digital images and interactions with the data scientist.

Further, the annotation set 104-1 and ordering constraints 106 can be input to an annotation set sequencer 108 to generate an ordered annotation set 108-1. More specifically, the annotation set sequencer 108 can sequence the data points from the annotation set 104-1 in a specific order based on the ordering constraints 106. The ordering constraints 106 can be a set of weights assigned to different classes of data points, such as budget, time, source, distribution, task, and the like. The budget can refer to a constraint on a budget, such as, a memory budget. Hence, with a constrained memory budget, the annotation set sequencer 108 can prioritize data points with relatively lower memory footprints. The time constraint can refer to a specific time period selection. For example, the time can indicate that the annotation set sequencer 108 prioritize data points collected from a certain year over data points collected from other years. The source constraint can identify specific sources of data points that the annotation set sequencer 108 prioritizes or de-prioritizes. The distribution can constrain data points with specific values. The task can constrain data points useful for a specific machine learning task. These are merely examples of potential ordering constraints 106, but others are also possible.

Ordering the data points in this way can be useful for improving the efficiency of training machine learning models. Thus, the ordered annotation set 108-1 can include training data for the machine learning model.

For example, where there are low volumes of data points within the annotation set 104-1, it may be useful to prioritize these data points when training the machine learning model. It is possible to prioritize these data points by sequencing these data points earlier in the ordered annotation set 108-1 than data points without a priority, or that are expressly de-prioritized in the ordering constraints 106. More specifically, within the corpus of the annotation set 104-1, e.g., the coreset, there may be a low number of data points in terms of the application (or task) being learned, e.g., images of wolves without snowy backgrounds. Thus, it may be useful to place the data points that are relevant to the application earlier in the sequence of training the machine learning model. Further, some data points might have a relatively higher priority because the data point may belong to a class where annotated data volume is low. Thus, to create a balance of distribution between sensitive columns, the ordering constraints 106 can prioritize some data points in the sequence before other data points. Additionally, some data points may arrive from low trust sources, e.g., a source that used unscientific methods, meaning that training can be improved by de-prioritizing such data points. Thus, sequencing the annotation set based on specific priorities in the ordering constraints 106 can be useful to improve the efficacy of training machine learning models.

In some embodiments of the present disclosure, the annotation set sequencer 108 can generate the ordered annotation set by defining the annotation set 104-1 mathematically. For example, the annotation set sequencer 108 can define the annotation set 104-1 as a set, shown in EQUATION 1:

$$C = set(d_1, d_2, d_3 \ldots d_n) \quad \text{EQUATION 1}$$

In EQUATION 1, $d_i$ represents the unlabeled data points in the annotation set 104-1. Further, an example set of ordering constraints 106 can include predetermined weights for data classes of source ($\alpha$), task ($\beta$), and sensitive person information ($\gamma$). Thus, the annotation set sequencer 108 can define a weightage set, as shown in EQUATION 2:

$$W = set(w_1, w_2, w_3 \ldots w_n), \text{ where } w_n = \alpha^* d_n(s) + \beta^* d_n(t) + \gamma^* d_n(p) \quad \text{EQUATION 2}$$

In EQUATION 2, s, t, and p, represent the respective data values for source, task, and sensitive personal information (SPI) for data point, $d_n$. Thus, the weight, $w_n$, can represent the total calculated weight for data point $d_n$, which the annotation set sequencer 108 can use to order the data points in set C, to generate the ordered annotation set 108-1. While this example includes example ordering constraints of source, task, and SPI, the ordering constraints 106 can include various additional constraints that a data scientist can configure to the machine learning scenario.

Figure 2:
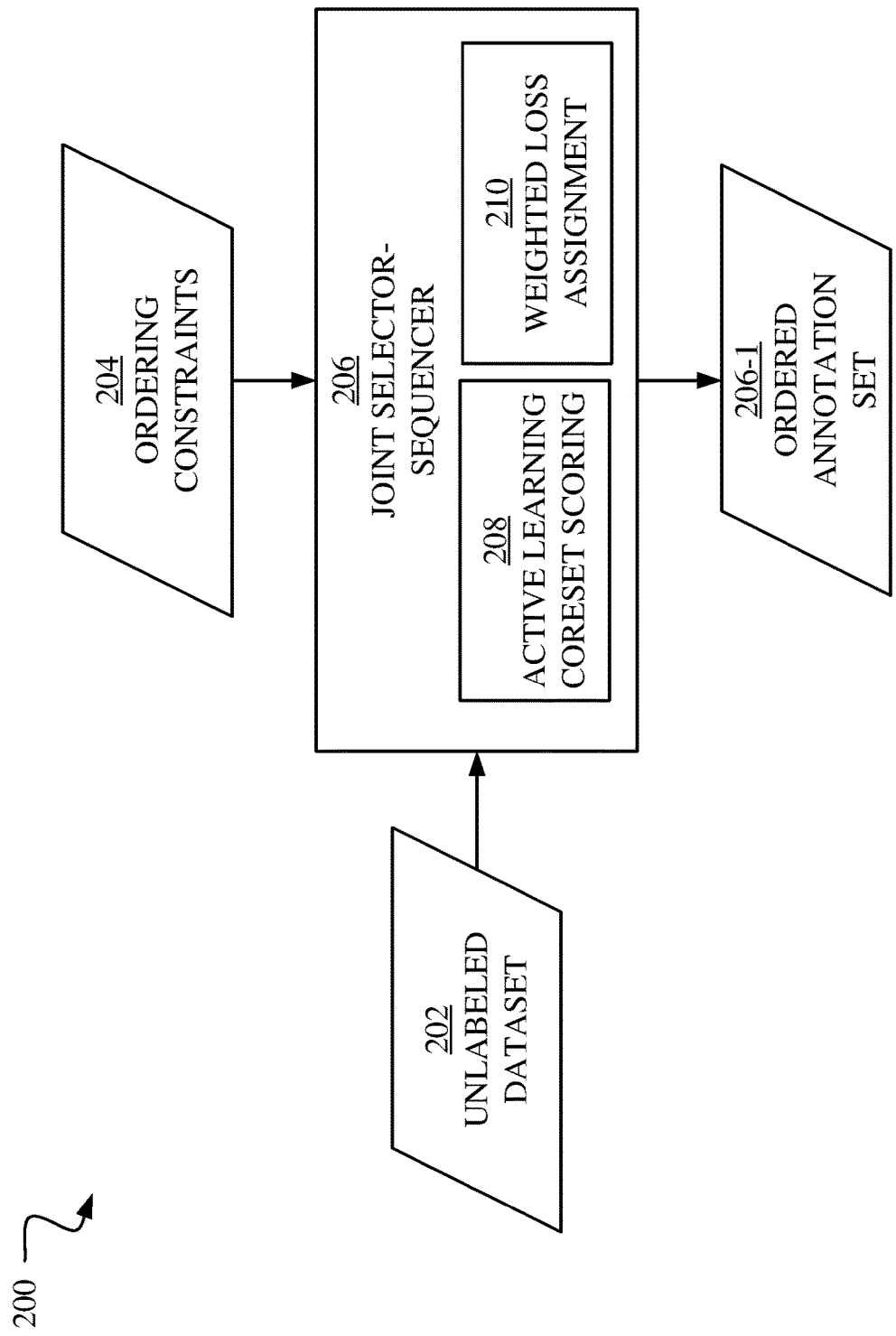
FIG. 2 is a data flow diagram of an example process for generating an ordered annotation set for machine learning, in accordance with some embodiments of the present disclosure.

FIG. 2 is a data flow diagram of an example process 200 for generating an ordered annotation set 206-1 for machine learning, in accordance with some embodiments of the present disclosure. The process 200 involves inputting an unlabeled dataset 202 and ordering constraints 204 to a joint selector-sequencer 206, which can generate an ordered annotation set 206-1. The unlabeled dataset 202, ordering constraints 204, and ordered annotation set 206-1 can be similar to the unlabeled dataset 102, ordering constraints 106, and ordered annotation set 108-1, described with respect to FIG. 1.

However, in contrast to the process 100, in the process 200, the joint selector-sequencer 206 can select the data points of the ordered annotation set 206-1 with an active learning method while enforcing the ordering constraints 204 in the selection function itself. More specifically, the joint selector-sequencer 206 can include processes for active learning coreset scoring 208 and weighted loss assignment 210. The active learning coreset scoring 208 can score the data points, $d_n$, of set C for selection into the coreset. The weighted loss assignment 210 can include a loss algorithm that determines loss based on the specified data classes and weights of the ordering constraints 204. Further, the joint selector-sequencer 206 can generate the ordered annotation set 206-1 by selecting the data points having the relatively highest losses, and sequencing the data points in order of descending loss. In some embodiments of the present disclosure, the joint selector-sequencer 206 can select the data points meeting, or falling below, a predetermined loss threshold.

For example, for ordering constraints 204, such as, source ($\alpha$), task ($\beta$), and sensitive person information ($\gamma$), each ordering constraint 204 can be associated with respective vectors for source, $S = [S_1, S_2, S_3 \ldots S_k]$; task, $T = [T_1, T_2, T_3 \ldots T_k]$; and. sensitive personal information, $P = [P_1, P_2, P_3 \ldots P_k]$. Further, the loss in the active learning coreset scoring 208 can be represented as shown in EQUATION 3:

$$L_i = L_{ac}(d_i), \text{ where } ac \text{ is active learning.} \quad \text{EQUATION 3}$$

Thus, the weighted loss assignment 210 can determine a weighted loss as shown in EQUATION 4:

$$L_{i(total)} = L_{ac}(d_i) + \alpha^* L_s(d_i(s), S) + \beta^* L_t(d_i(t), T) + \gamma^* L_p(d_i(p), P) \quad \text{EQUATION 4}$$

Further, the weighted loss assignment 210 can select the data points for the ordered annotation set 206-1 based on a predetermined threshold that can be specified in the ordering constraints 204. Accordingly, the joint selector-sequencer 206 can select the data points with an $L_{i(total)}$ that meets and/or falls below the predetermined threshold for inclusion in the ordered annotation set 206-1. Additionally, the joint selector-sequencer 206 can sequence the selected data points based on decreasing value of weighted loss.

Figure 3:
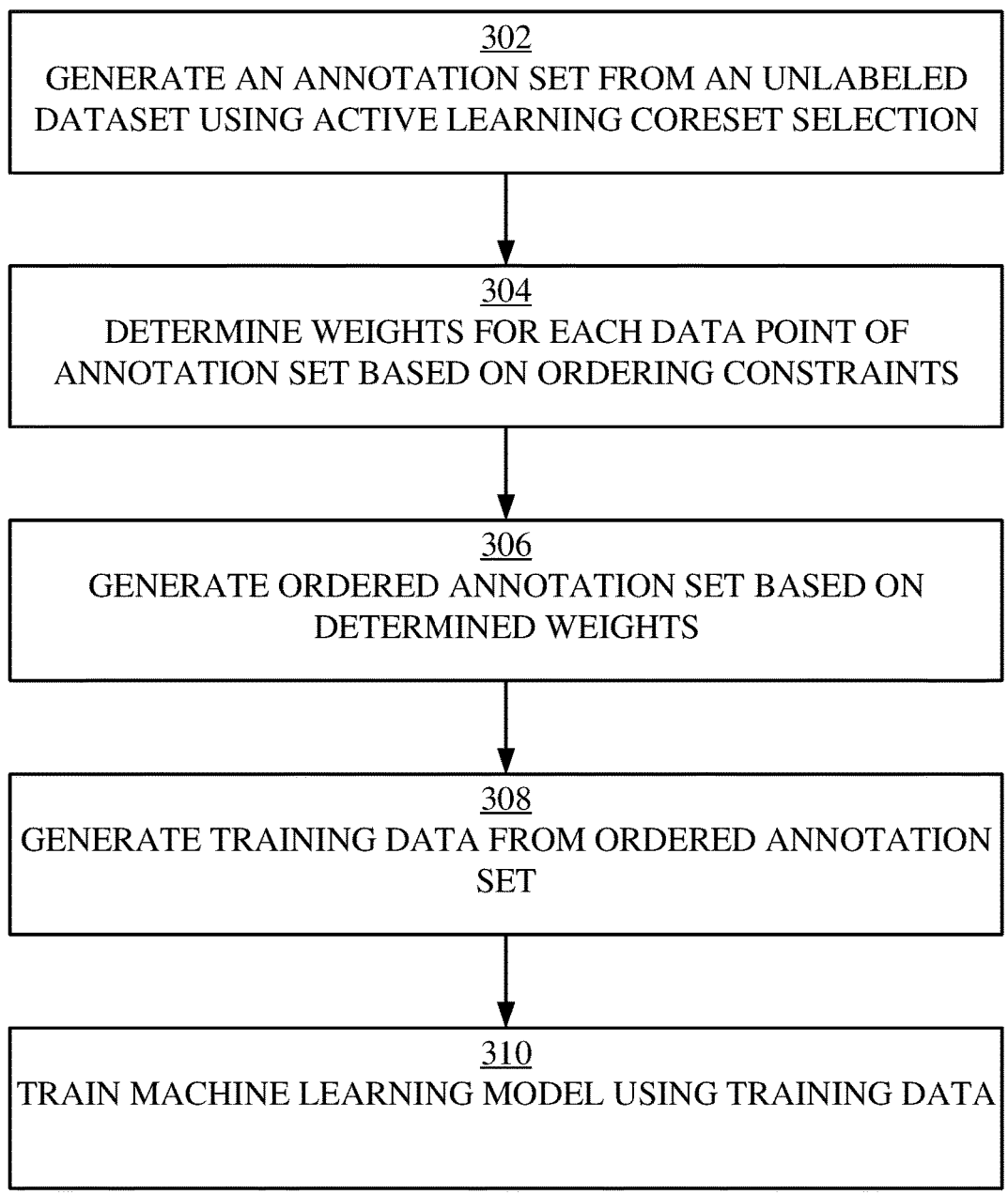
FIG. 3 is a process flow diagram of an example method for ordering annotation sets for machine learning, in accordance with some embodiments of the present disclosure.

FIG. 3 is a process flow diagram of an example method 300 for ordering an annotation set for machine learning, in accordance with some embodiments of the present disclosure. An annotation selection process and an annotation set sequencer, such as the annotation selection process 104 and annotation set sequencer 108, described with respect to FIG. 1, can perform operations of the method 300. Referring back to FIG. 3, an active learning tool and a machine learning model can also perform operations of the method 300.

At operation 302, the annotation selection process 104 can generate an annotation set from an unlabeled dataset using active learning coreset selection. As stated previously, the annotation selection process 104 can involve the use of an active learning tool configured for coreset selection. Accordingly, the annotation selection process 104 can generate an annotation set, such as the annotation set 104-1 from the unlabeled dataset 102.

At operation 304, the annotation set sequencer 108 can determine weights for each data point of the annotation set 104-1 based on the ordering constraints. As stated previously, ordering constraints, such as the ordering constraints 106 can specify classes of data (e.g., source, distribution, task, and the like) in the annotation set 104-1, to prioritize. In some embodiments of the present disclosure, the ordering constraints 106 can assign weights to these classes of data. Thus, classes of data with greater weights can represent higher priorities, and correspondingly earlier positions in the ultimate sequence of the data points.

At operation 306, the annotation set sequencer 108 can generate an ordered annotation set, such as the ordered annotation set 108-1, based on the determined weights. More specifically, the annotation set sequencer 108 can generate the ordered annotation set 108-1 in descending order of the determined weights.

At operation 308, an active learning tool can generate training data from the ordered annotation set 108-1. More specifically, a data scientist can use an active learning tool to label the data points in the ordered annotation set 108-1. Further, the training data can have the same sequence of data points as the ordered annotation set 108-1.

At operation 310, a machine learning model can train itself using the training data. As stated previously, ordering the training data according to specific priorities, such as represented in the ordering constraints 106, can improve the effectiveness of training machine learning models. In this way, the annotation set sequencer 108 improves the efficiency of training, and the proficient operation of, machine learning models.

Figure 4:
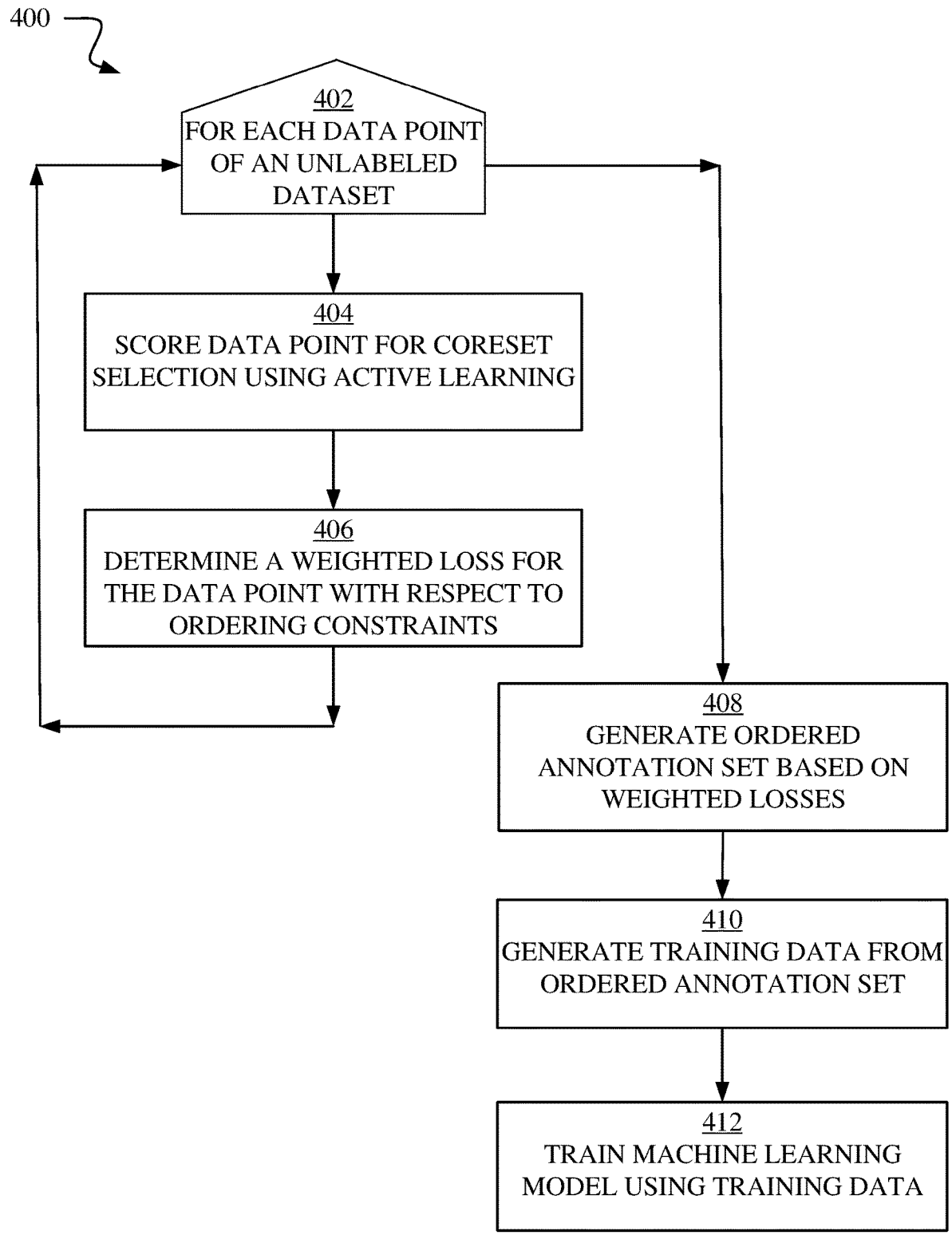
FIG. 4 is a process flow diagram of an example method for generating an ordered annotation set for machine learning, in accordance with some embodiments of the present disclosure.

FIG. 4 is a process flow diagram of an example method 400 for generating an ordered annotation set for machine learning, in accordance with some embodiments of the present disclosure. A joint selector-sequencer, such as the joint selector-sequencer 206, described with respect to FIG. 2, can perform operations of the method 400. More specifically, the joint selector-sequencer 206 can perform operations 402 through 406 for each data point in an unlabeled dataset, such as the unlabeled dataset 202.

At operation 404, the joint selector-sequencer 206 can score a data point for coreset selection using active learning. As stated previously, an active learning tool, such as the annotation selection process 104 can be configured for coreset selection. Accordingly, the joint selector-sequencer 206 can determine a score relevant to coreset selection for a machine learning model. The score can indicate the likelihood of representation in a coreset, such as the ordered annotation set 206-1.

At operation 406, the joint selector-sequencer 206 can determine a weighted loss for the data point with respect to the ordering constraints. As stated previously, ordering constraints, such as the ordering constraints 106, can associate weights with classes of data (e.g., source, distribution, task, and the like) in the annotation set 104-1. Further, these weights can prioritize and de-prioritize associated classes of data in the annotation set 104-1. Accordingly, the joint selector-sequencer 206 can include a loss algorithm that determines loss for the data point based on the specified data classes and weights of the ordering constraints 204.

As stated previously, the joint selector sequencer 206 can perform operations 402 through 406 for each data point in the unlabeled dataset 202. Further, upon completion of the last data point in the unlabeled dataset 202, the joint selector-sequencer 206, an active learning tool, and a machine learning model can perform respective operations 408, 410, and 412 of the method 400.

At operation 408, the joint selector-sequencer 206 can generate the ordered annotation set 206-1 based on the weighted losses. More specifically, the joint selector-sequencer 206 can select the data points from the unlabeled dataset 202 based on a predetermined loss threshold that can be specified in the ordering constraints 204. Accordingly, the joint selector-sequencer 206 can select all data points that meet and/or fall below the predetermined threshold for inclusion in the ordered annotation set 206-1. Additionally, the joint selector-sequencer 206 can sequence the included data points in decreasing value of weighted loss.

At operation 410, an active learning tool can generate training data from the ordered annotation set 206-1. More specifically, a data scientist can use an active learning tool to label the data points in the ordered annotation set 206-1. Further, the training data can have the same sequence of data points as the ordered annotation set 206-1.

At operation 412, a machine learning model can train itself using the training data. As stated previously, ordering the training data according to specific priorities, such as represented in the ordering constraints 204, can improve the effectiveness of generating coresets for machine learning. Further, these ordered annotation sets can improve the efficacy of training machine learning models. In this way, the joint selector-sequencer 206 can improve the efficiency of training, and the proficient operation of, machine learning models.

Figure 5:
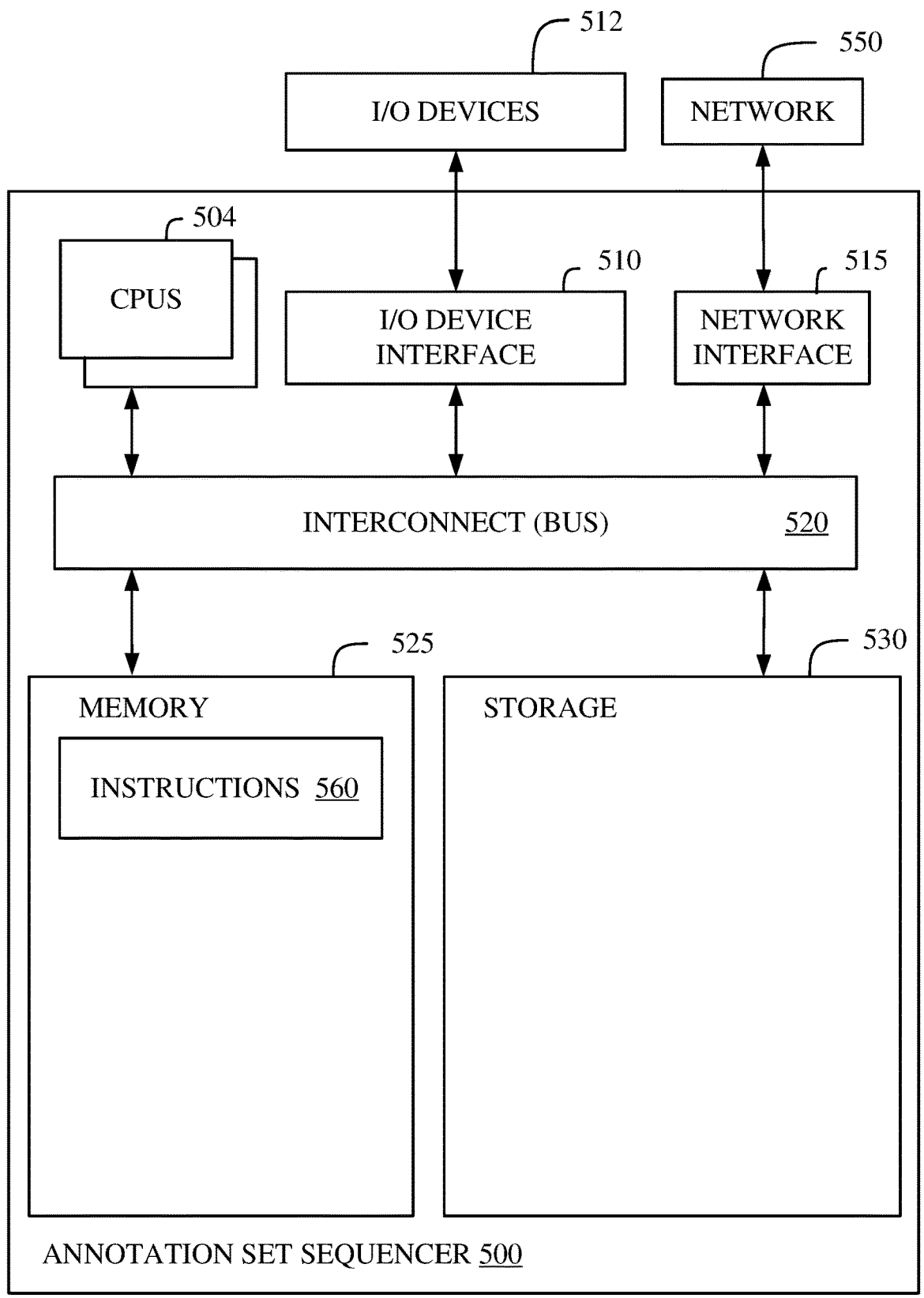
FIG. 5 is a block diagram of an example annotation set sequencer, in accordance with some embodiments of the present disclosure.

FIG. 5 is a block diagram of an example annotation set sequencer 500, in accordance with some embodiments of the present disclosure. In various embodiments, the annotation set sequencer 500 is similar to the annotation set sequencer 108 and joint selector-sequencer 206, can perform the methods described in FIGS. 3-4, and/or the functionality discussed in FIGS. 1 and 2. In some embodiments, the annotation set sequencer 500 provides instructions for the aforementioned methods and/or functionalities to a client machine such that the client machine executes the method, or a portion of the method, based on the instructions provided by the annotation set sequencer 500. In some embodiments, the annotation set sequencer 500 comprises software executing on hardware incorporated into a plurality of devices.

The annotation set sequencer 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the annotation set sequencer 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the methods described in FIGS. 3-4 and/or the functionality discussed in FIGS. 1 and 2.

In various embodiments, the I/O devices 512 include an interface capable of presenting information and receiving input. For example, I/O devices 512 can present information to a listener interacting with annotation set sequencer 500 and receive input from the listener.

The annotation set sequencer 500 is connected to the network 550 via the network interface 515. Network 550 can comprise a physical, wireless, cellular, or different network.

In some embodiments, the annotation set sequencer 500 can be a multi-user mainframe computer system, a single-user system, or a server computer or similar device that has little or no direct user interface but receives requests from other computer systems (clients). Further, in some embodiments, the annotation set sequencer 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary annotation set sequencer 500. In some embodiments, however, individual components can have greater or lesser complexity than as represented in FIG. 5, components other than or in addition to those shown in FIG. 5 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
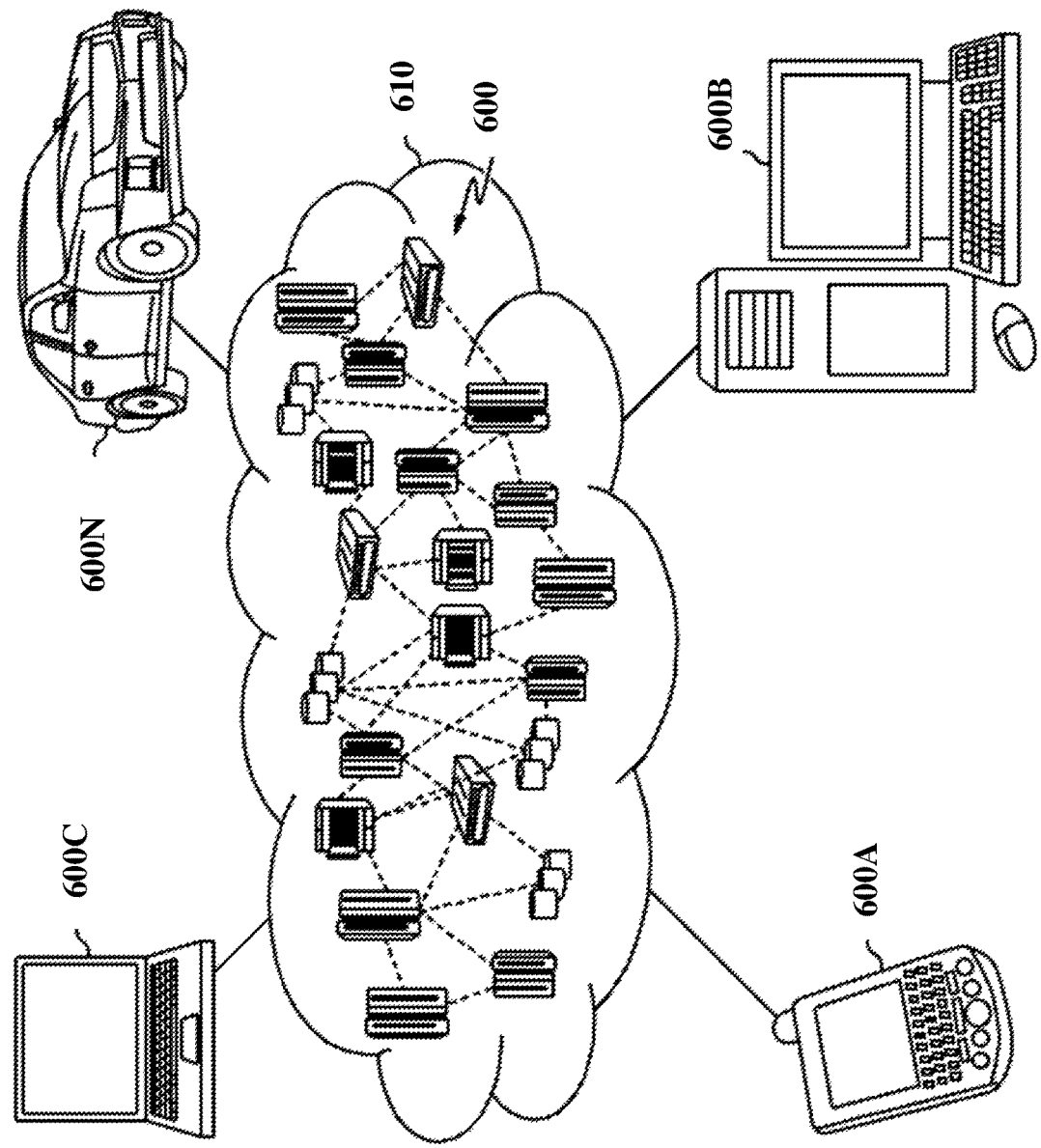
FIG. 6 is a cloud computing environment, in accordance with some embodiments of the present disclosure.

FIG. 6 is a cloud computing environment 610, according to some embodiments of the present disclosure. As shown, cloud computing environment 610 includes one or more cloud computing nodes 600. The cloud computing nodes 600 can perform the method described in FIGS. 3-4 and/or the functionality discussed in FIGS. 1 and 2. Additionally, cloud computing nodes 600 can communicate with local computing devices used by cloud consumers, such as, for example, personal digital assistant (PDA) or cellular telephone 600A, desktop computer 600B, laptop computer 600C, and/or automobile computer system 600N. Further, the cloud computing nodes 600 can communicate with one another. The cloud computing nodes 600 can also be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
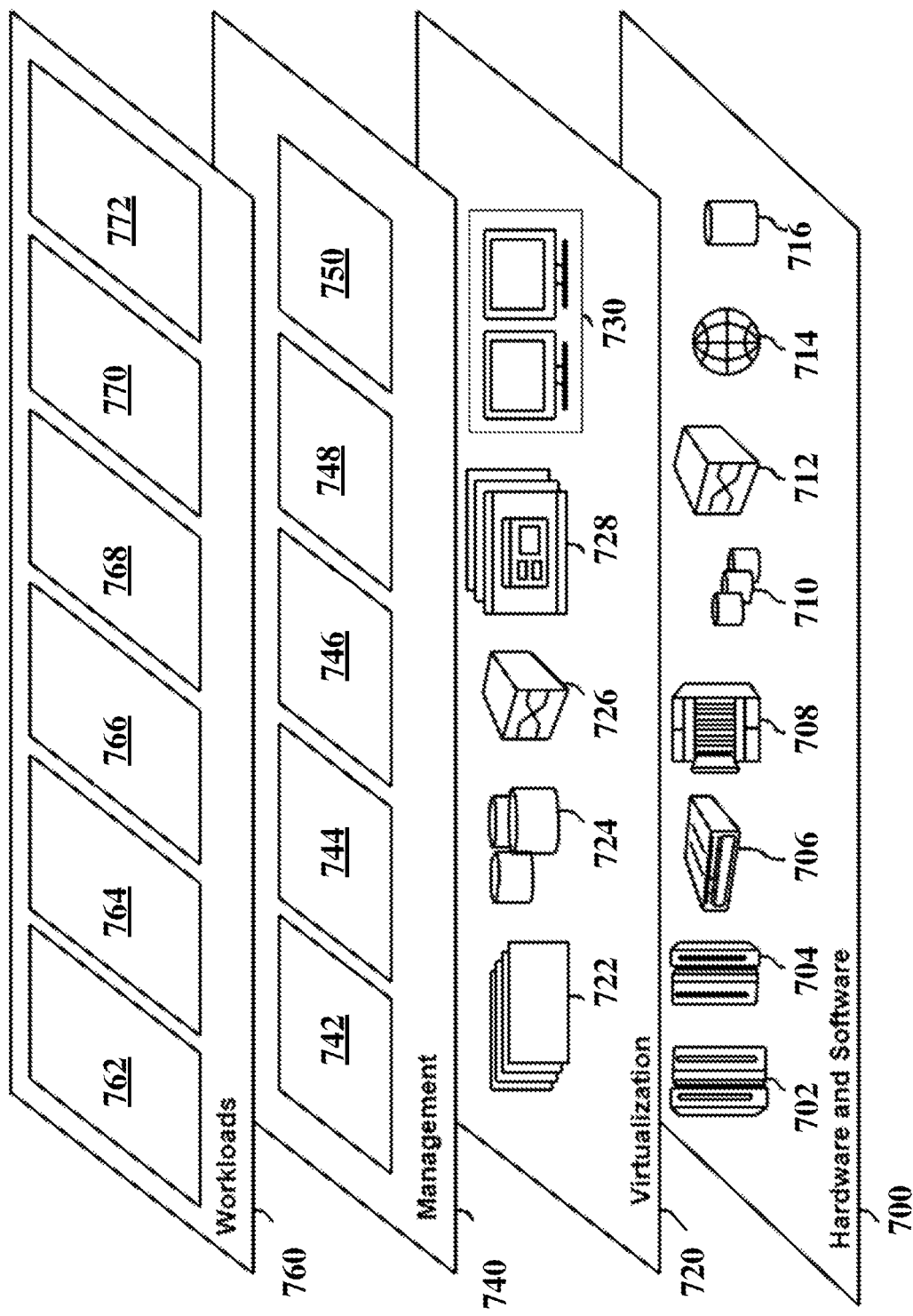
FIG. 7 is a set of functional abstraction model layers provided by the cloud computing environment, in accordance with some embodiments of the present disclosure.

FIG. 7 is a set of functional abstraction model layers provided by cloud computing environment 610 (FIG. 6), according to some embodiments of the present disclosure. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 740 can provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service level management 748 can allocate suitable processing power and memory to process static sensor data. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment can be utilized. Examples of workloads and functions which can be provided from this layer include: mapping and navigation 762; software development and lifecycle management 764; virtual classroom education delivery 766; data analytics processing 768; transaction processing 770; and annotation set sequencer 772.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A non-limiting list of examples are provided hereinafter to demonstrate some aspects of the present disclosure. Example 1 is a computer-implemented method. The method includes receiving an annotation set for a machine learning model, wherein the annotation set comprises a plurality of data points relevant to a task for the machine learning model; determining a plurality of total weights corresponding to the plurality of data points, wherein the total weights are determined based on a plurality of ordering constraints indicating: a plurality of data classes; and a corresponding plurality of weights, wherein the corresponding plurality of weights represent a relative priority of the data classes with respect to each other; and generating an ordered annotation set from the annotation set, wherein the ordered annotation set comprises the plurality of data points in a sequence based on the determined plurality of total weights.

Example 2 includes the method of example 1, including or excluding optional features. In this example, the sequence is of decreasing value of the total weights.

Example 3 includes the method of any one of examples 1 to 2, including or excluding optional features. In this example, the method includes generating training data for the machine learning model from the ordered annotation set by labeling the annotation set. Optionally, the method includes training the machine learning model using the training data. Optionally, the method includes performing the task using the trained machine learning model.

Example 4 includes the method of any one of examples 1 to 3, including or excluding optional features. In this example, the method includes generating the annotation set from an unlabeled dataset using an active learning method.

Example 5 includes the method of any one of examples 1 to 4, including or excluding optional features. In this example, the ordering constraints are selected from a group consisting of: a source of a data point; a distribution of a value of the data point; one or more fields of the data point relevant to the task; a budget for the ordered annotation set; and a time associated with the data point.

Example 6 is a computer program product. The computer program product includes one or more computer readable storage media, and program instructions collectively stored on the one or more computer readable storage media, the program instructions comprising instructions configured to cause one or more processors to perform a method comprising: receiving an unlabeled dataset for a machine learning model, wherein the unlabeled dataset comprises a plurality of data points relevant to a task for the machine learning model; determining a plurality of weighted losses corresponding to the plurality of data points based on a loss algorithm for a plurality of coreset selection scores corresponding to the plurality of data points, wherein the weighted losses are determined based on a plurality of ordering constraints indicating: a plurality of data classes; and a corresponding plurality of weights, wherein the corresponding plurality of weights represent a relative priority of the data classes with respect to each other; and generating an ordered annotation set from the unlabeled dataset by: selecting a selected plurality of data points from the unlabeled dataset having a corresponding weighted loss that meets a predetermined threshold; and sequencing the selected plurality of data points in the ordered annotation set, based on the plurality of weighted losses.

Example 7 includes the computer program product of example 6, including or excluding optional features. In this example, the sequence is of decreasing value of the weighted losses.

Example 8 includes the computer program product of any one of examples 6 to 7, including or excluding optional features. In this example, the computer program product includes generating training data for the machine learning model from the ordered annotation set by labeling the annotation set. Optionally, the computer program product includes training the machine learning model using the training data. Optionally, the computer program product includes performing the task using the trained machine learning model.

Example 9 includes the computer program product of any one of examples 6 to 8, including or excluding optional features. In this example, the computer program product includes determining the plurality of coreset selection scores using an active learning tool.

Example 10 includes the computer program product of any one of examples 6 to 9, including or excluding optional features. In this example, the ordering constraints are selected from a group consisting of: a source of a data point; a distribution of a value of the data point; one or more fields of the data point relevant to the task; a budget for the ordered annotation set; and a time associated with the data point.

Example 11 is a system. The system includes one or more computer processing circuits; and one or more computer-readable storage media storing program instructions which, when executed by the one or more computer processing circuits, are configured to cause the one or more computer processing circuits to perform a method comprising: receiving an unlabeled dataset for a machine learning model, wherein the unlabeled dataset comprises a plurality of data points relevant to a task for the machine learning model; determining a plurality of weighted losses corresponding to the plurality of data points based on a loss algorithm for a plurality of coreset selection scores corresponding to the plurality of data points, wherein the plurality of weighted losses are determined based on a plurality of ordering constraints indicating: a plurality of data classes; and a corresponding plurality of weights, wherein the corresponding plurality of weights represent a relative priority of the data classes with respect to each other; and generating an ordered annotation set from the unlabeled dataset by: selecting a selected plurality of data points from the unlabeled dataset having a corresponding weighted loss that meets a predetermined threshold; and sequencing the selected plurality of data points in the ordered annotation set, based on the plurality of weighted losses, wherein the sequence is of decreasing value of the weighted losses.

Example 12 includes the system of example 11, including or excluding optional features. In this example, the system includes generating training data for the machine learning model from the ordered annotation set by labeling the annotation set. Optionally, the system includes training the machine learning model using the training data. Optionally, the system includes performing the task using the trained machine learning model.

Example 13 includes the system of any one of examples 11 to 12, including or excluding optional features. In this example, the system includes determining the plurality of coreset selection scores using an active learning tool.

Example 14 includes the system of any one of examples 11 to 13, including or excluding optional features. In this example, the ordering constraints are selected from a group consisting of: a source of a data point; a distribution of a value of the data point; one or more fields of the data point relevant to the task; a budget for the ordered annotation set; and a time associated with the data point.

What is claimed is:

1. A computer-implemented method, comprising:
receiving an annotation set for a machine learning model, wherein the annotation set comprises a plurality of data points relevant to a task for the machine learning model;
determining a plurality of total weights corresponding to the plurality of data points, wherein the total weights are determined based on a plurality of ordering constraints indicating:
a plurality of data classes; and
a corresponding plurality of weights, wherein the corresponding plurality of weights represent a relative priority of the data classes with respect to each other; and
generating an ordered annotation set from the annotation set by constraining an active learning tool to select and sequence the plurality of data points based on a loss algorithm for the plurality of ordering constraints.

2. The method of claim 1, wherein the plurality of data points is sequenced in decreasing value of the total weights.

3. The method of claim 1, further comprising generating training data for the machine learning model from the ordered annotation set by labeling the annotation set.

4. The method of claim 3, further comprising training the machine learning model using the training data.

5. The method of claim 4, further comprising performing the task using the trained machine learning model.

6. The method of claim 1, further comprising generating the annotation set from an unlabeled dataset using an active learning method.

7. The method of claim 1, wherein the ordering constraints are selected from a group consisting of:
a source of a data point;
a distribution of a value of the data point;
one or more fields of the data point relevant to the task;
a budget for the ordered annotation set; and
a time associated with the data point.

8. A computer program product comprising one or more computer readable storage media, and program instructions collectively stored on the one or more computer readable storage media, the program instructions comprising instructions configured to cause one or more processors to perform a method comprising:
receiving an unlabeled dataset for a machine learning model, wherein the unlabeled dataset comprises a plurality of data points relevant to a task for the machine learning model;
determining a plurality of weighted losses corresponding to the plurality of data points based on a loss algorithm for a plurality of coreset selection scores corresponding to the plurality of data points, wherein the weighted losses are determined based on a plurality of ordering constraints indicating:
a plurality of data classes; and
a corresponding plurality of weights, wherein the corresponding plurality of weights represent a relative priority of the data classes with respect to each other; and
generating an ordered annotation set from the unlabeled dataset by constraining an active learning tool to select and sequence the plurality of data points based on a loss algorithm for the plurality of ordering constraints.

9. The computer program product of claim 8, wherein the plurality of data points is sequenced in decreasing value of the weighted losses.

10. The computer program product of claim 8, the method further comprising generating training data for the machine learning model from the ordered annotation set by labeling the annotation set.

11. The computer program product of claim 10, the method further comprising training the machine learning model using the training data.

12. The computer program product of claim 11, the method further comprising performing the task using the trained machine learning model.

13. The computer program product of claim 8, the method further comprising determining the plurality of coreset selection scores using an active learning tool.

14. The computer program product of claim 8, wherein the ordering constraints are selected from a group consisting of:
a source of a data point;
a distribution of a value of the data point;
one or more fields of the data point relevant to the task;
a budget for the ordered annotation set; and
a time associated with the data point.

15. A system comprising:
one or more computer processing circuits; and
one or more computer-readable storage media storing program instructions which, when executed by the one or more computer processing circuits, are configured to cause the one or more computer processing circuits to perform a method comprising:

receiving an unlabeled dataset for a machine learning model, wherein the unlabeled dataset comprises a plurality of data points relevant to a task for the machine learning model;

determining a plurality of weighted losses corresponding to the plurality of data points based on a loss algorithm for a plurality of coreset selection scores corresponding to the plurality of data points, wherein the plurality of weighted losses are determined based on a plurality of ordering constraints indicating:

a plurality of data classes; and a corresponding plurality of weights, wherein the corresponding plurality of weights represent a relative priority of the data classes with respect to each other; and generating an ordered annotation set from the unlabeled dataset by constraining an active learning tool to select and sequence the plurality of data points based on a loss algorithm for the plurality of ordering constraints.

16. The system of claim 15, the method further comprising generating training data for the machine learning model from the ordered annotation set by labeling the annotation set.

17. The system of claim 16, the method further comprising training the machine learning model using the training data.

18. The system of claim 17, the method further comprising performing the task using the trained machine learning model.

19. The system of claim 15, the method further comprising determining the plurality of coreset selection scores using an active learning tool.

20. The system of claim 15, wherein the ordering constraints are selected from a group consisting of:

a source of a data point;

a distribution of a value of the data point;

one or more fields of the data point relevant to the task;

a budget for the ordered annotation set; and a time associated with the data point.

\* \* \* \* \*